(12) United States Patent
Morgan

(10) Patent No.: US 7,191,261 B2
(45) Date of Patent: Mar. 13, 2007

(54) SYSTEM AND METHOD TO USE UNMODIFIED OPERATING SYSTEM ON DISKLESS COMPUTER

(75) Inventor: Stephen Paul Morgan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 09/933,494

(22) Filed: Aug. 20, 2001

(65) Prior Publication Data

US 2003/0037189 A1 Feb. 20, 2003

(51) Int. Cl.
G06F 13/12 (2006.01)
G06F 13/38 (2006.01)

(52) U.S. Cl. .......................................... 710/62; 710/74
(58) Field of Classification Search .................. 710/5, 710/8, 33, 36, 62, 74
See application file for complete search history.

(56) References Cited

U.S. PATENT DOCUMENTS

| 4,958,278 | A | * | 9/1990 | Meguro ....................... 709/219 |
| 5,142,680 | A | * | 8/1992 | Ottman et al. ............... 717/176 |
| 5,349,643 | A | * | 9/1994 | Cox et al. .................... 713/155 |
| 5,404,527 | A | * | 4/1995 | Irwin et al. .................. 709/222 |
| 5,802,365 | A | * | 9/1998 | Kathail et al. ............... 709/321 |
| 5,974,547 | A | | 10/1999 | Klimenko ....................... 713/2 |
| 6,324,644 | B1 | * | 11/2001 | Rakavy et al. ................. 713/1 |
| 6,477,624 | B1 | * | 11/2002 | Kedem et al. ............... 711/147 |
| 2002/0087854 | A1 | * | 7/2002 | Haigh et al. .................... 713/1 |

* cited by examiner

Primary Examiner—Fritz Fleming
Assistant Examiner—David Martinez
(74) Attorney, Agent, or Firm—John L. Rogitz

(57) ABSTRACT

A system and method for using a conventional, unmodified operating system that routinely issues disk I/O requests in a diskless network computer. An adapter receives the disk I/O requests and translates them to network I/O requests, transparently to the CPU. The requests are satisfied using the network. In this way, the operating system need not be modified to issue network calls instead of disk requests.

24 Claims, 1 Drawing Sheet

SYSTEM AND METHOD TO USE UNMODIFIED OPERATING SYSTEM ON DISKLESS COMPUTER

BACKGROUND OF THE INVENTION

1. Field of the Invention

The present invention relates generally to secure network computers.

2. Description of the Related Art

Secure network computers (SNC) are used in secure networks, such as "virtual private networks" (VPN), that are as a practical matter not accessible to computers outside the network. Secure networks can be used by companies and agencies desiring to maintain confidential information on a computer network while permitting only authorized people to access the network via the SNC of the network.

As part of security efforts, it might be desirable that secure network computers operate without significant non-volatile memory such as hard disk drives. This is because data control is made less complicated when all data remains in a single network drive, being downloaded from the network drive by the individual computers on an as-needed basis. That is, depriving network computers of local hard disk drives ensures that multiple copies of potentially sensitive data are not dispersed throughout the network, but rather that the sensitive data is maintained in a single network location, thereby simplifying data control and security.

Simply removing the local hard disk drives from network computers and allowing the computers to access a network drive instead, however, is not without complications. Among these complications is the fact that most computers "boot up" when energized by retrieving the computer's operating system from a local hard disk drive. The operating system is then temporarily stored in high speed volatile memory until the computer is deenergized, at which time the operating system is no longer available in the volatile memory. Furthermore, once booted, most computer operating systems are designed to frequently issue input/output (I/O) requests for data to a local drive connected to the main data bus of the computer, not to a network.

One way to address the above-noted problem is to provide modified versions of a boot program and operating system that issue I/O requests to a network port instead of to a local hard drive. However, modifying an operating system is expensive and requires operating system vendor support, which may not exist. The present invention critically recognizes that it would be desirable to enable the use of an off-the-shelf, unmodified operating system that can be accessed at a network location in a secure computer network for temporary storage in local volatile memory, and that subsequently can operate in a diskless computer.

SUMMARY OF THE INVENTION

The invention is an adapter for use in a general purpose computer and that is configured according to the inventive steps herein. The invention can also be embodied as an article of manufacture—a machine component—that is used by a digital processing apparatus.

Accordingly, a system includes a computer that in turn includes a central processing unit (CPU) but that does not include a local hard disk drive. An adapter is coupled to the CPU for receiving local disk I/O requests. Also, a network resource communicates with the adapter for satisfying the local disk I/O requests.

In a preferred embodiment, the adapter is plugged into a motherboard holding the CPU. Alternatively, the adapter is connected to the motherboard by a connecting cable. In either case, the adapter translates disk I/O requests into network I/O requests. The adapter need be only a disk adapter but can also be a computer network adapter as well.

In the preferred embodiment, the adapter includes a sequence of bytes identifying the adapter to the CPU as a secondary boot device. Accordingly, the adapter can cause a conventional operating system configured for generating local disk I/O requests to be loaded from a network storage to a volatile memory in the computer, without modifying an operating system. For convenience, the adapter may be housed within the computer.

In another aspect, a method for facilitating, in a diskless computer, the use of an operating system not modified to not issue local disk I/O requests includes receiving local disk I/O requests from the operating system at an adapter housed within the diskless computer. The method also includes satisfying the local disk I/O requests by accessing a network communicating with the diskless computer.

In still another aspect, a diskless computer includes a CPU running an operating system that is not modified to not issue local disk I/O requests. A disk-free adapter communicates with the operating system and receives disk I/O requests therefrom. Also, a network connection is provided through which the disk I/O requests can be satisfied despite the lack of a local hard disk drive in the computer.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
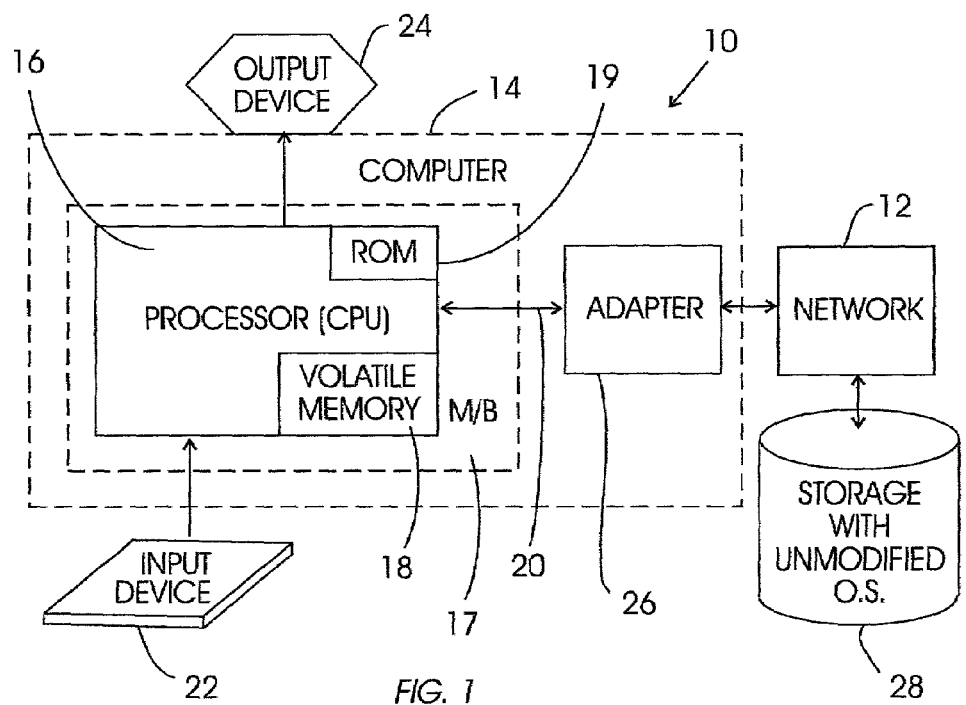
FIG. 1 is a schematic diagram of the present system.

Referring initially to FIG. 1, a system is shown, generally designated 10, for promoting security of a secure network 12. The network 12 has plural secure network computers (SNC) 14 (only a single SNC 14 shown for clarity), each of which has a central processing unit (CPU) 16 that accesses local volatile memory 18 such as CPU caches, as well as non-hard disk drive RAM and ROM 19. The CPU 16, among other components, can be mounted on a motherboard 17 in the SNC 14. In the exemplary embodiment shown, the CPU 16 is an Intel® Pentium®, although the principles advanced herein apply equally to other types of computer systems.

As shown in FIG. 1, the CPU 16 is connected to a main bus 20. The bus 20 can be a Peripheral Component Interconnect (PCI) bus of the SNC 14. However, the principles of the present invention apply to other interconnect systems including but not limited to IDE systems, small computer systems interface (SCSI) systems, the so-called Firewire system, personal computer memory card interface architecture (PCMCIA), and so on.

The SNC 14 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. In any case, apart from the ROM 19 the SNC 14 has no significant non-volatile memory, and in particular has no local hard disk drive. In that respect, the SNC 14 is a diskless computer.

The SNC 14 can receive data from an input device 22 such as a keyboard or mouse, and can output data to an output device 24 such as a monitor. Other input devices, including keypads, trackballs, and voice recognition devices can be used, as can other output devices, such as printers, other computers or data storage devices, and computer networks. In any case, the SNC 14 includes a network connection that can be connected to a computer network, such as the network 12, in accordance with principles known in the art.

In one preferred implementation, a hardware-based non-disk drive adapter 26 is engaged with the main bus 20 by plugging the adapter 26 into the PCI bus 20 on the motherboard 17 of the SNC 14, inside the SNC 14. When plugged into the PCI bus 20 the adapter 26 appears as a disk drive adapter. The adapter 26 can be an adapter as described below in combination with a conventional network adapter, or it can be an adapter that undertakes only the functions described below, in which case a separate conventional network adapter (not shown) would be provided. In another embodiment, the adapter 26 is connected to the motherboard 17 of the SNC 14 by an IDE or SCSI cable, in which case the adapter 26 would appear as a disk drive, e.g., an IDE or SCSI drive connected to or hanging off of a real disk drive adapter. In yet another embodiment, the adapter 26 is a software module that appears as a virtual disk.

In any case, the adapter 26 appears to the CPU 16 as a local hard disk drive or as a local hard disk drive adapter. Actually, however, as set forth further below the adapter 26 simply intercepts disk I/O requests, transforms them into network requests, and satisfies the requests by communicating with the network 12. For example, the adapter 26 can access data, including operating system files, that are stored in a network storage device 28 using the network 12. The adapter 26 includes logic circuits and/or a series of computer-executable instructions to execute the logic described below.

Figure 2:
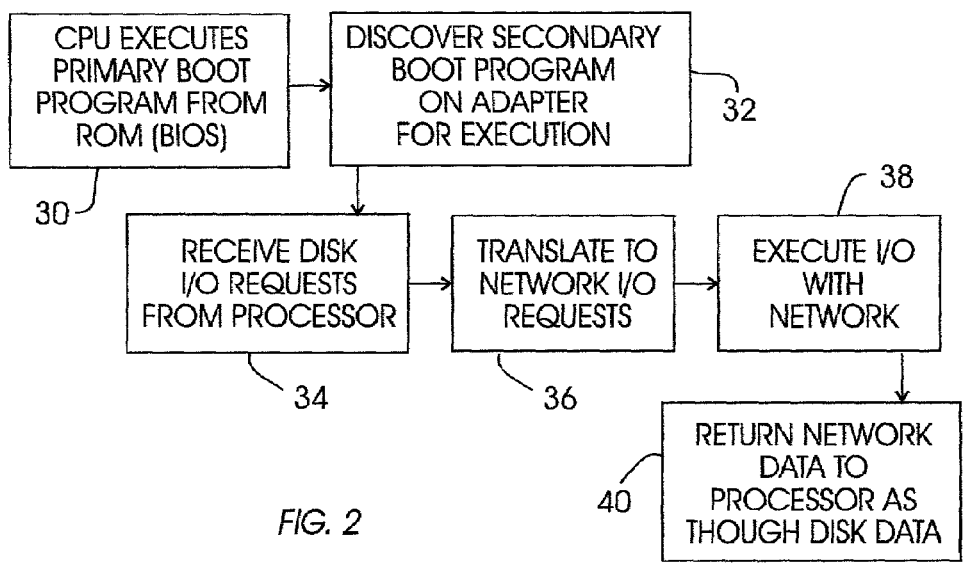
FIG. 2 is a flow chart of the logic of the present invention.

Reference is now made to FIG. 2, which shows the overall logic of the present invention. Commencing at block 30, upon power-on reset the CPU 16 loads a set of initial instructions from a known location in ROM 19 into RAM and executes the instructions in accordance with principles known in the art. The initial instructions are referred to as the ROM boot sequence or primary boot program, and are often referred to as part of the basic input/output system (BIOS).

Next, moving to block 32 the CPU 16 searches for a secondary boot device that stores a relatively more sophisticated program, typically referred to as a secondary boot program, that loads an operating system into the volatile memory 18. Conventionally, the secondary boot program is located entirely in the first sector of the secondary boot device, usually a hard disk drive, but recall that in the present SNC 14 no hard drive is present. As recognized herein, however, a suitable boot program is identified by a specific "signature" or sequence of bytes within the program itself. Accordingly, the adapter 26 is provided with such a signature, so that the CPU 16 determines that the necessary secondary boot program is located on the adapter 26.

Proceeding to block 34, the adapter 26 receives disk I/O requests from the CPU 16. These I/O requests initially can be secondary boot program calls, which eventually result in I/O requests to load an operating system into volatile memory 18. At block 36 the disk I/O requests are translated by the adapter 26 to network I/O requests, transparently to the CPU 16 and its attendant operating system. At block 38 the network requests are sent to the network 12 for execution thereof. In this way, the operating system is loaded into volatile memory 18 and then, subsequent to loading, local disk I/O requests from the operating system are satisfied using the network 12. Requested data from the network 12 is returned to the adapter 26 at block 40, which then sends the data to the CPU 16 as though the data had been retrieved from a local hard disk drive.

In this way, a conventional, unmodified operating system can first be loaded from, e.g., the network storage 28 into volatile memory 18 of the diskless SNC 14. Then, the operating system can be executed by the CPU 16, generating disk I/O requests in accordance with conventional operating system principles known in the art The requests, however, are not sent to a (non-existent) disk drive in the SNC 14, but instead are received by the adapter 26, which satisfies them using the network 12 in accordance with the principles above.

While the particular SYSTEM AND METHOD TO USE UNMODIFIED OPERATING SYSTEM ON DISKLESS COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A system, comprising:
    a computer including a central processing unit (CPU) but not including a local hard disk drive;
    an adapter coupled to the CPU for receiving local disk I/O requests therefrom, the adapter translating disk I/O requests into network I/O requests; and
    at least one network resource communicating with the adapter for satisfying the local disk I/O requests.

2. The system of claim 1, wherein the adapter is plugged into a motherboard holding the CPU.

3. The system of claim 1, wherein the adapter is connected by a connecting cable to a motherboard holding the CPU.

4. The system of claim 1, wherein the adapter is also a computer network adapter.

5. The system of claim 1, wherein the adapter is not a conventional computer network adapter, the computer including a conventional network adapter separate from the adapter.

6. The system of claim 1, wherein the adapter includes a sequence of bytes identifying the adapter to the CPU as a secondary boot device.

7. The system of claim 1, wherein the adapter causes a conventional operating system configured for generating local disk I/O requests to be loaded from a network storage to a volatile memory in the computer.

8. The system of claim 1, wherein the adapter is housed within the computer.

9. A method for facilitating, in a discless computer, the use of an operating system not modified to not issue local disk I/O requests, comprising:

receiving local disk I/O requests from the operating system; and satisfying the local disk I/O requests by accessing a network communicating with the diskless computer, wherein the satisfying act includes translating the local disk I/0 requests to network requests at an adapter engaged with the diskless computer transparently to a CPU in the diskless computer.

10. The method of claim 9 comprising plugging the adapter into a motherboard holding a CPU of the diskless computer.

11. The method of claim 9 comprising connecting the adapter to a motherboard holding a CPU of the diskless computer using a connecting cable.

12. The method of claim 9 wherein the adapter is also a computer network adapter.

13. The method of claim 9 wherein the adapter is not a conventional computer network adapter, the diskless computer including a conventional network adapter separate from the adapter.

14. The method of claim 9 wherein the adapter includes a sequence of bytes identifying the adapter to a CPU of the diskless computer as a secondary boot device.

15. The method of claim 9 comprising causing a conventional operating system configured for generating local disk I/O requests to be loaded from a network storage to a volatile memory in the computer.

16. The method of claim 9 comprising disposing the adapter in the computer.

17. A diskless computer, comprising:

a CPU running an operating system not modified to not issue local disk I/O requests;

a disk-free adapter communicating with the operating system and receiving disk I/O requests therefrom, the adapter translating the disk I/O requests to network requests; and a network connection through which the disk I/O requests can be satisfied despite the lack of a local hard disk drive in the computer.

18. The computer of claim 17, wherein the adapter is plugged into a motherboard holding the CPU.

19. The computer of claim 17, wherein the adapter is connected by a connecting cable to a motherboard holding the CPU.

20. The computer of claim 17, wherein the adapter is also a computer network adapter.

21. The computer of claim 17, wherein the adapter is not a conventional computer network adapter, the computer including conventional network adapter separate from the adapter.

22. The computer of claim 17, wherein the adapter includes a sequence of bytes identifying the adapter to the CPU as a secondary boot device.

23. The computer of claim 17, wherein the adapter causes the operating system to be loaded from a network storage to a volatile memory in the computer.

24. The computer of claim 17, wherein the adapter is housed within the computer.

* * * * *